US007221681B2

(12) United States Patent
Choi et al.

(10) Patent No.: US 7,221,681 B2
(45) Date of Patent: May 22, 2007

(54) APPARATUS AND METHOD FOR PROVIDING IEEE 802.11E HYBRID COORDINATOR RECOVERY AND BACKOFF RULES

(75) Inventors: Sunghyun Choi, Montvale, NJ (US); Javier del Prado, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 1113 days.

(21) Appl. No.: 10/180,600

(22) Filed: Jun. 26, 2002

(65) Prior Publication Data

US 2003/0091066 A1 May 15, 2003

Related U.S. Application Data

(60) Provisional application No. 60/351,800, filed on Nov. 13, 2001.

(51) Int. Cl.
*H04L 12/413* (2006.01)
*G06F 15/16* (2006.01)

(52) U.S. Cl. ....................................... 370/447; 370/448

(58) Field of Classification Search ................ 370/447, 370/448
See application file for complete search history.

(56) References Cited

U.S. PATENT DOCUMENTS 6,304,912 B1 * 10/2001 Oguchi et al. .............. 709/238
6,934,297 B1 * 8/2005 Bensaou et al. ............ 370/445
2002/0120740 A1 * 8/2002 Ho et al. .................... 709/225
2002/0163933 A1 * 11/2002 Benveniste ................ 370/465

FOREIGN PATENT DOCUMENTS

EP 1237382 A2 9/2002
WO WO9835453 8/1998
WO 0165773 A2 9/2001
WO 0184789 A2 11/2001

OTHER PUBLICATIONS

IEEE 802.11-01/412r0 "Aligning 802.11e HCF and 802.11h TPC Operations" by Amjad Soomro, SungHyun Choi, and Javier del Prado. Jul. 2001. □□□□Downloaded from <http://grouper.ieee.org/groups/802/11/Documents/D1T101-150.html>.*

IEEE 802.11-01/128r1 "HCF Channel Access And INter-BBS Channel Sharing" by Jun-Meng Ho, Sid Schrum, Khaled Turki, and Donald P. Shaver. Jul. 2001. □□□□Downloaded from <http://grouper.ieee.org/groups/802/11/Documents?D1T101-150.html>□□.*

"MAC sublayer functional description" ANSI/IEEE STD 802.11, 1999 Edition, 'Online! 1999, pp. 70-97.

* cited by examiner

*Primary Examiner*—Chau Nguyen
*Assistant Examiner*—U-Lun Wang

(57) ABSTRACT

An apparatus and method is disclosed for providing recovery and backoff rules for a hybrid coordinator of an IEEE 802.11e Quality of Service (QoS) wireless station. The invention comprises a wireless local area network that is capable of using the recovery and backoff rules of the present invention in the Medium Access Control (MAC) layer of QoS hybrid coordinators. The HC recovery and backoff rules of the present invention minimize collisions especially when hybrid coordinators from an overlapping basic service set are present.

3 Claims, 8 Drawing Sheets

START
500
510 HC SENDS A FRAME THAT REQUIRES A RESPONSE ( e.g., QoS (+) CF-POLL FRAME )
520 IS PHY-CCA.indication (busy) DETECTED AT THE HC DURING PIFS FROM THE END OF THE FRAME TRANSMISSION ?
YES GO TO STEP 610
NO
530 DOES HC ALGORITHM SELECT BACKOFF ?
YES 540 HC PERFORMS A BACKOFF AFTER PIFS AFTER THE END OF THE FRAME
NO
550 HC PERFORMS A RECOVERY BY TRANSMITTING DURING THE FIRST TIME SLOT FOLLOWING PIFS AFTER THE END OF THE FRAME
CONTINUE

APPARATUS AND METHOD FOR PROVIDING IEEE 802.11E HYBRID COORDINATOR RECOVERY AND BACKOFF RULES

PRIORITY CLAIM TO PROVISIONAL PATENT APPLICATION

This patent application claims priority to U.S. Provisional Patent Application Ser. No. 60/351,800 filed on Nov. 13, 2001.

TECHNICAL FIELD OF THE INVENTION

The present invention is generally directed to systems and methods for processing multimedia signals, and, in particular, to an apparatus and method for providing recovery and backoff rules for an IEEE 802.11e Quality of Service (QoS) hybrid coordinator.

BACKGROUND OF THE INVENTION

The development of high quality multimedia devices, such as set-top boxes, high end televisions, digital televisions, personal televisions, storage products, personal digital assistants (PDAs), wireless Internet devices, etc., is leading to a variety of architectures and to more openness towards new features for these devices. The development of these new multimedia products ensures that the public will continue to increase its demand for multimedia services. Network designers and engineers are therefore continuing to design systems that are capable of meeting the increasing demand for both real time and non-real time multimedia transfer across integrated networks.

The Internet Protocol (IP)-based Internet provides a "best effort" data delivery service that does not guarantee any service level to the users. A "best effort" service over the IP network allows the complexity to stay at the end-hosts, so that the network can remain simple. The phenomenal growth of the Internet shows that this approach scales well.

On the other hand, in recent years, the IEEE 802.11 wireless local area network (WLAN) has emerged as a prevailing technology for the (indoor) broadband wireless access for mobile/portable devices. IEEE 802.11 can be considered a wireless version of "Ethernet" by virtue of supporting a "best effort" service. The IEEE 802.11 Working Group is currently defining a new supplement to the existing legacy 802.11 Medium Access Control (MAC) layer in order to support Quality of Service (QoS). The new 802.11e MAC will expand the 802.11 application domain by enabling such applications as voice and video services over wireless local area networks (WLANs).

The new IEEE 802.11e standard will constitute the industry's first true universal wireless standard supporting QoS. IEEE 802.11e will offer seamless interoperability across home, enterprise, and public access networking environments, yet still offer features that meet the unique needs of each type of network. Unlike other wireless initiatives, IEEE 802.11e is the first wireless standard that spans home and business environments by adding QoS features and multimedia support to the existing IEEE 802.11 standard, while maintaining full backward compatibility with the legacy standard.

The QoS support for multimedia traffic is critical to wireless home networks where voice, audio, and video will be delivered across multiple networked home electronic devices and personal computers. Broadband service providers view QoS and multimedia-capable home networks as an essential ingredient to offering residential customers value-added services such as video on demand, audio on demand, voice over IP and high speed Internet access.

In order to provide adequate service, some level of quantitative and qualitative determinations of the types of network services will be required. This requires adding some capability to the network to enable the network to distinguish traffic with strict timing requirements on delay, jitter and loss from other types of traffic. This is what the protocols for QoS provisioning are designed to achieve. QoS provisioning does not create bandwidth, but manages bandwidth more effectively to meet a wide range of application requirements. The goal of QoS provisioning is to provide some level of predictability and control beyond the current IP "best effort" service.

The currently proposed IEEE 802.11e specification provides recovery and backoff rules for a hybrid coordinator (HC) of a Quality of Service (QoS) wireless network. However, the rules as currently proposed are inconsistent in that they do not provide an appropriate response in every case that might occur during the operation of the HC.

HC backoff is not needed in those cases in which the HC has full control of the wireless medium. However, HC backoff is desirable in those cases in which an Overlapping Basic Service Set (OBSS) is present. But performing an HC backoff may result in a collision between QoS wireless stations (QSTAs) in the Quality of Service (QoS) Basic Service Set (QBSS) and the HC.

There is therefore a need in the art for an apparatus and method that will provide a more comprehensive and consistent set of recovery and backoff rules for the Medium Access Control (MAC) layer of an IEEE 802.11e Quality of Service (QoS) hybrid coordinator.

SUMMARY OF THE INVENTION

The present invention generally comprises an apparatus and method for providing recovery and backoff rules for the Medium Access Control (MAC) layer of a hybrid coordinator of an IEEE 802.11e Quality of Service (QoS) wireless network.

An apparatus and method is disclosed for providing recovery and backoff rules for such a hybrid coordinator. The invention comprises a wireless local area network that is capable of using the recovery and backoff rules of the present invention in the Medium Access Control (MAC) layer of a QoS hybrid coordinator. The HC recovery and backoff rules of the present invention minimize collisions especially in when hybrid coordinators from an overlapping basic service set are present.

It is an object of the present invention to provide an apparatus and method for providing hybrid coordinator recovery and backoff rules that permit a hybrid coordinator to perform a backoff when hybrid coordinators from an overlapping basic service set are present.

It is also an object of the present invention to provide an apparatus and method for providing hybrid coordinator recovery and backoff rules that permit a hybrid coordinator to perform a random backoff with a fixed contention window size.

It is another object of the present invention to provide an apparatus and method for providing hybrid coordinator recovery and backoff rules that permit a hybrid coordinator to perform a recovery or a backoff depending upon the occurrence of a PHY-RXSTART.indication as well as the occurrence of a PHY-CCA.indication.

It is an additional object of the present invention to provide an apparatus and method for providing hybrid coordinator recovery and backoff rules that permit a hybrid coordinator to avoid collision with an enhanced distributed coordination function (EDCF) access by increasing the value of an arbitration interframe space (AIFS) of wireless stations.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments set forth in this patent document to describe the principles of the improved system and method of the present invention are by way of illustration only and should not be construed in any way to limit the scope of the invention. Those skilled in the art will readily understand that the principles of the present invention may also be successfully applied in any type of hybrid coordinator in a wireless network system.

Figure 1:
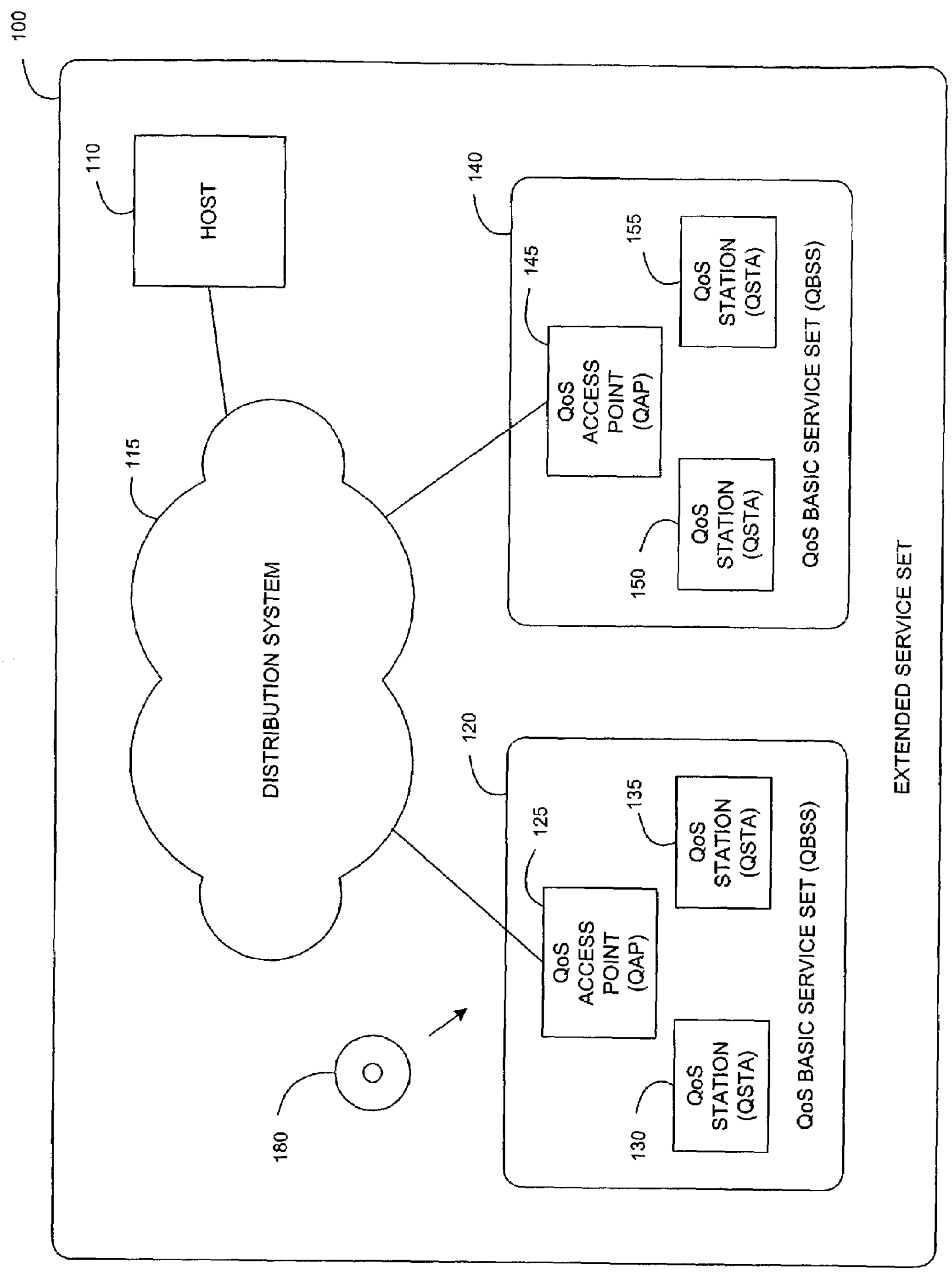
FIG. 1 illustrates an exemplary prior art extended service set of a wireless local area network (WLAN) comprising a host, a distribution system, a first Quality of Service (QoS) basic service set (QBSS), and a second Quality of Service (QoS) basic service set.

FIG. 1 illustrates an exemplary prior art extended service set 100 of a wireless local area network (WLAN). Extended service set 100 comprises host 110, distribution system 115, a first Quality of Service (QoS) basic service set (QBSS) 120, and a second Quality of Service (QoS) basic service set (QBSS) 140. A QoS basic service set (QBSS) comprises a number of wireless QoS stations (QSTA) that execute the same Medium Access Control (MAC) protocol and compete for access to the same shared medium. A QBSS may be isolated or it may be connected to a distribution system. Typically, a distribution system is a wired backbone local area network (LAN).

A Quality of Service (QoS) Access Point (QAP) is a QoS station that is connected to a distribution system. The QAP functions as a bridge between a QBSS and the distribution system. The MAC protocol of a QBSS may be fully distributed or controlled by a central coordination function within the QAP of the QBSS. As shown in FIG. 1, QBSS 120 is connected to distribution system 115 through QAP 125 and QBSS 140 is connected to distribution system 115 through QAP 145.

Figure 2:
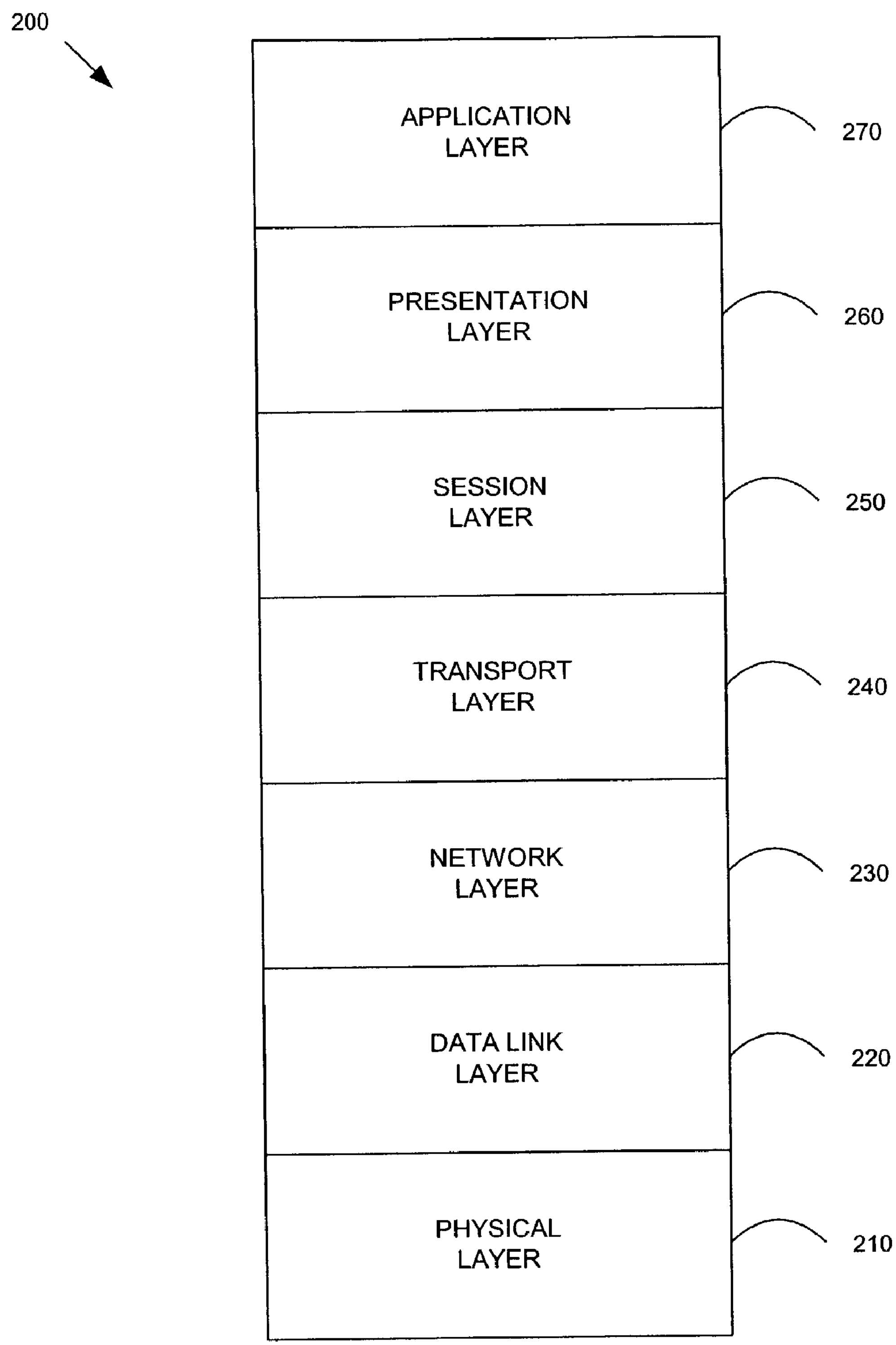
FIG. 2 illustrates seven prior art Open Systems Interconnection (OSI) network layers.

FIG. 2 illustrates seven prior art Open Systems Interconnection (OSI) network layers. These layers are well known in the art and are included here for reference. The first layer is Physical Layer 210, the second layer is Data Link Layer 220, the third layer is Network Layer 230, the fourth layer is Transport Layer 240, the fifth layer is Session Layer 250, the sixth layer is Presentation Layer 260, and the seventh layer is Application Layer 270.

Figure 3:
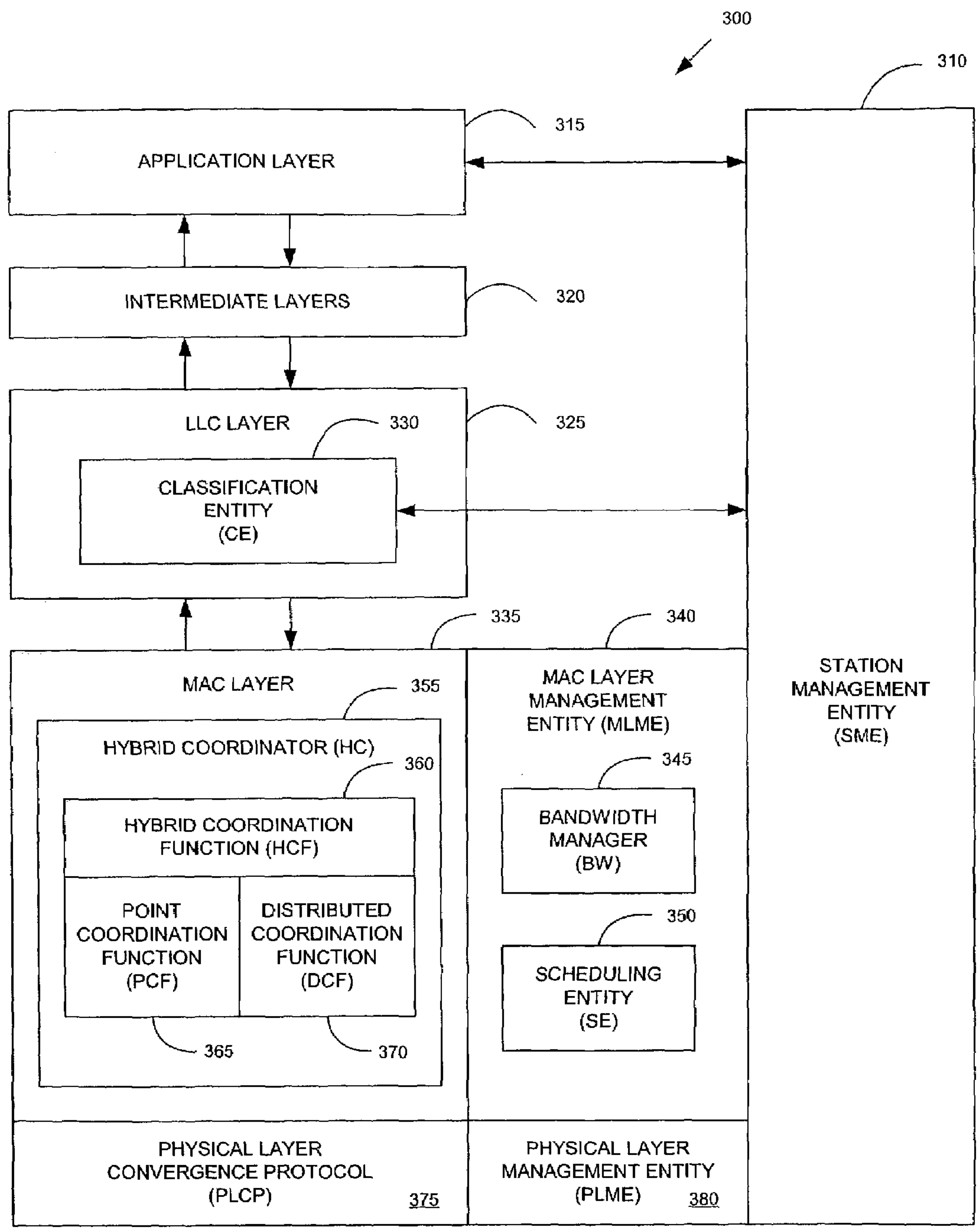
FIG. 3 illustrates an exemplary prior art architecture of a Quality of Service (QoS) station with a hybrid coordinator capability.

FIG. 3 illustrates an exemplary prior art architecture 300 of a Quality of Service (QoS) hybrid coordinator. This exemplary architecture is well known in the art and is included here for reference. Station Management Entity (SME) 310 extends from the Application Layer to the Physical Layer. The Physical Layer is represented in FIG. 3 by Physical Layer Convergence Protocol (PLCP) 375 and Physical Layer Management Entity (PLME) 380. MAC Layer 335 is located above the Physical Layer Convergence Protocol (PLCP) 375. MAC Layer Management Entity (MLME) 340 is located above the Physical Layer Management Entity (PLME) 380.

The Logical Link Control Layer (LLC Layer) 325 is located above MAC Layer 335. LLC Layer 325 comprises Classification Entity (CE) 330. Intermediate Layers 320 are located above LLC Layer 325. Application Layer 315 is located above Intermediate Layers 320.

MAC Layer 355 may comprise Hybrid Coordinator 355. Hybrid Coordinator 355 comprises Hybrid Coordination Function (HCF) 360, Point Coordination Function (PCF) 365 and Distributed Coordination Function (DCF) 370. MAC Layer Management Function (MLME) 340 comprises Bandwidth Manager (BM) 345 and Scheduling Entity (SE) 350.

Figure 4:
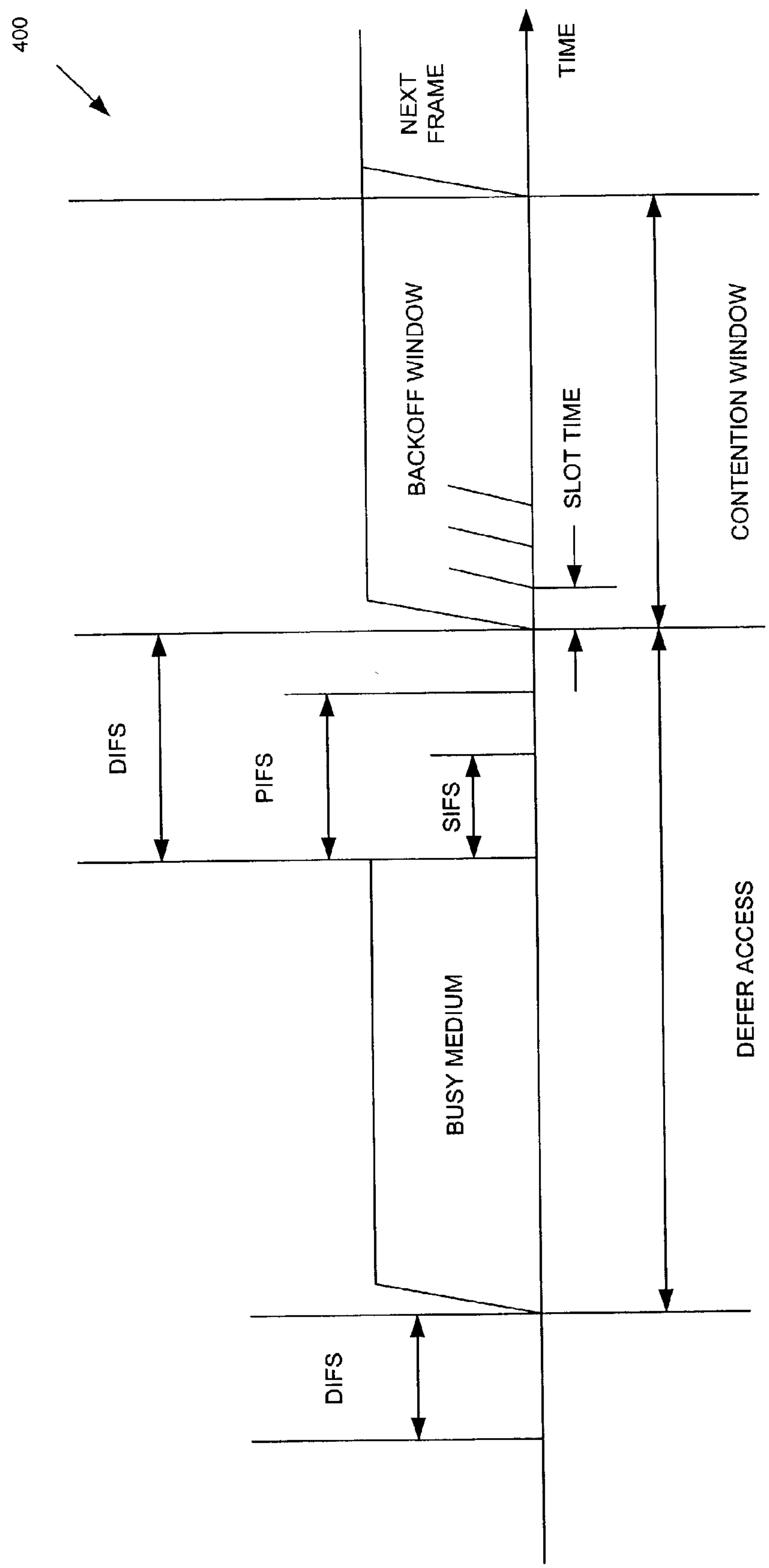
FIG. 4 illustrates an exemplary timing diagram illustrating a basic prior art access method for IEEE 802.11 Medium Access Control and the use of a short interframe space (SIFS), a point coordination function interframe space (PIFS), and a distributed coordination function interframe space (DIFS)

FIG. 4 illustrates an exemplary timing diagram 400 illustrating a basic prior art access method for IEEE 802.11 Medium Access Control in a Quality of Service (QoS) station (QSTA). This exemplary timing diagram is well known in the art and is included here for reference. Timing diagram 400 illustrates the operation of a Carrier Sense Multiple Access (CSMA) algorithm of a Distributed Coordination Function (DCF). Timing diagram 400 also illustrates three interframe spaces that are used in the CSMA algorithm. The interframe spaces include a short interframe space (SIFS), a mid-length point coordination function interframe space (PIFS), and a long distributed coordination function interframe space (DIFS). An additional type of interframe space defined by the IEEE 802.11e specification is an arbitration interframe space (AIFS). The AIFS is not shown in FIG. 4.

The currently proposed IEEE 802.11e specification provides recovery and backoff rules for a hybrid coordinator (HC). However, the proposed rules are inconsistent in that they do not provide an appropriate response in every case that might occur during the operation of the HC.

HC backoff is not needed in those cases in which the HC has full control of the wireless medium. However, HC backoff is desirable in those cases in which an Overlapping Basic Service Set (OBSS) exists. But performing an HC backoff may result in a collision between QoS wireless stations (QSTAs) in the Quality of Service (QoS) Basic Service Set (QBSS) and the HC.

Consider the following portion of the proposed IEEE 802.11e draft 2.0. Paragraph 9.10 states in part: "A HC may perform a backoff following an interruption of a frame exchange sequence due to lack of an expected response from a (Q)STA, or due to detection of CCA busy within a CFP or CFB. This backoff shall occur under the rules of the EDCF, suing dot11CWmin[7] and dot11AIFS[7]."

Next consider the following portion of the proposed IEEE 802.11e draft 2.0. Paragraph 9.10.1.2 states in part: "QSTAs, including the HC, are required to respond within any frame exchange sequence after a SIFS period. If the beginning of reception of an expected response, as detected by the occurrence of PHY-CCA.indication(busy) at the QSTA which is expecting the response, does not occur during the first slot time following SIFS, that QSTA may initiate recovery by transmitting after PIFS from the end of the last transmission. This recovery after PIFS is only permitted by the QSTA expecting the response. This QSTA is the HC in case of a QoS(+)CF-Poll frame, and is the TXOP holder in case of a QoS data type frame transmitted during a CFB."

The problem with the proposed IEEE 802.11e specification is that there is currently no way for the HC to determine (1) whether a QoS(+)CF-Poll frame was received correctly, or (2) whether a frame received by the HC was from a QSTA that was polled. If a QoS(+)CF-Poll frame was received incorrectly or if a frame received by the HC was from a QSTA that was not polled, the result will be a loss of a transmission opportunity (TXOP). However, there is currently no way for the HC to find out this information.

After the HC sends a QoS(+)CF-Poll frame, the HC senses the wireless medium. If a PHY-CCA.indication(busy) is not detected, then the HC can either (1) recover transmission by sending a second frame (as described in Paragraph 9.10.1.2), or (2) may perform a backoff (as described in Paragraph 9.10). If a PHY-CCA.indication(busy) is detected, then the HC can either (1) remain silent during the rest of the CFB (as described in Paragraph 9.10.1.2), or (2) may perform a backoff (as described in Paragraph 9.10). However, the HC will not perform a backoff because of the rule of Paragraph 9.10.1.2.

The present invention solves this problem by providing a different set of HC recovery and backoff rules. The HC recovery and backoff rule of the present invention are as follows:

(1) If a PHY-CCA.indication(busy) is not detected within a period of time equal to PIFS after the HC has sent a frame that requires a response (e.g., QoS(+)CF-Poll frame), the HC may either recover transmission or perform a backoff. This decision is made by an HC algorithm that is not within the scope of the IEEE 802.11e specification. In one advantageous embodiment of the present invention, if the HC is aware of the existence of an Overlapping Basic Service Set (OBSS), then the HC performs a backoff after a period of time equal to PIFS after the end of the frame that was sent. The HC algorithm may perform a recovery by transmitting during the first time slot that follows a period of time equal to PIFS after the end of the frame that was sent.

Figure 5:
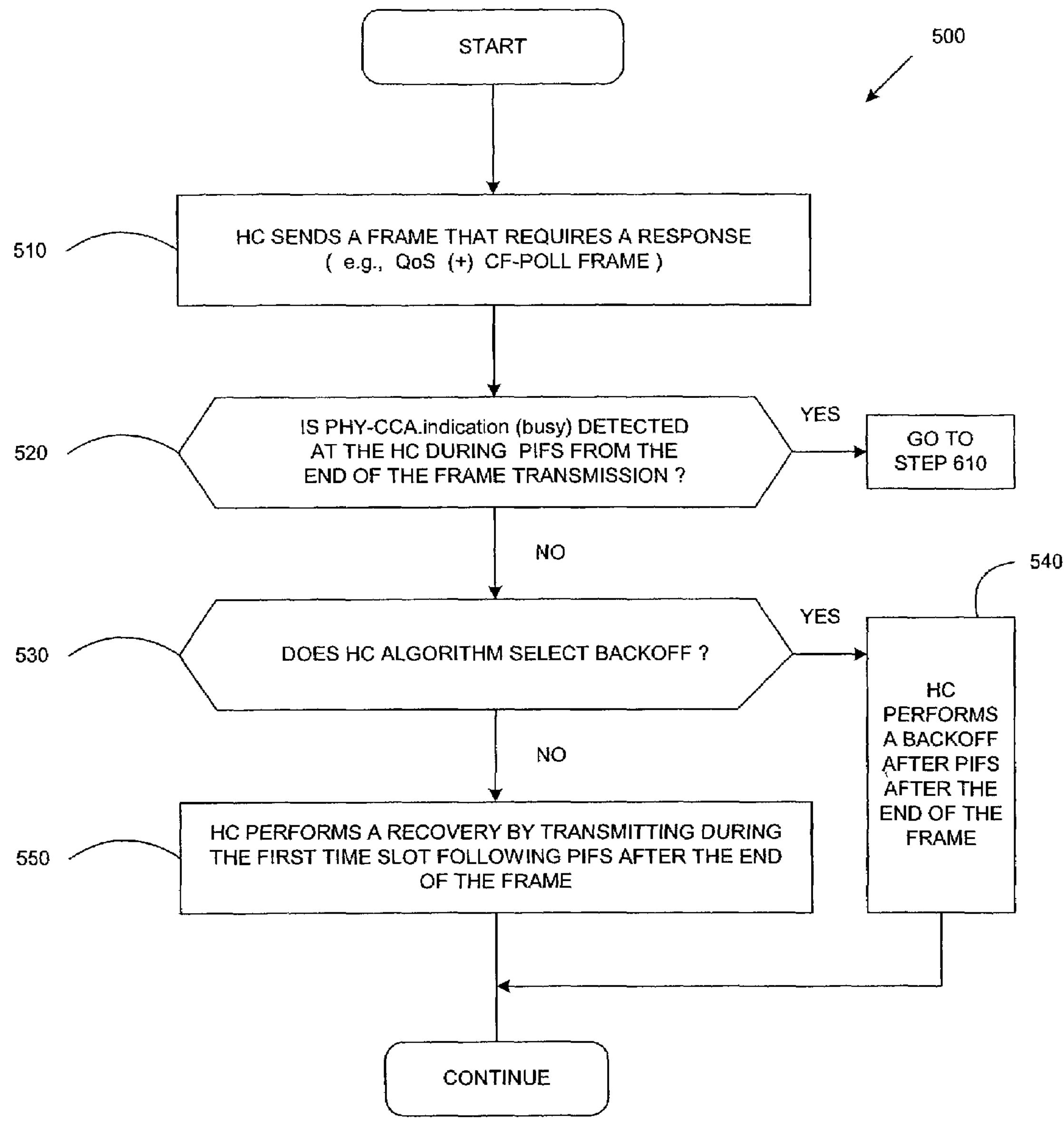
FIG. 5 is a flow chart illustrating a first portion of an advantageous embodiment of a method of the present invention for providing hybrid coordinator recovery and backoff.

The operation of the HC recovery and backoff rules described above is summarized in FIG. 5. FIG. 5 is a flow chart illustrating a first portion of an advantageous embodiment of a method of the present invention for providing hybrid coordinator recovery and backoff. The steps shown in FIG. 5 are collectively referred to with the reference numeral 500.

First, the HC sends a frame that requires a response (e.g., QoS(+)CF-Poll frame) (step 510). Then the HC determines whether a PHY-CCA.indication(busy) is detected during a period of time equal to PIFS from the end of the transmission of the frame (decision step 520). If a PHY-CCA.indication(busy) is detected, the control passes to step 610 of FIG. 6 to perform operations that will be described later.

If a PHY-CCA.indication(busy) is not detected, then the HC algorithm operates to determine whether to perform a recovery or to backoff (decision step 530). If the HC is aware of the existence of an OBSS, the HC may perform a backoff after a period of time equal to PIFS after the end of the frame.

If the HC algorithm selects a backoff, then control passes to step 540 and the HC performs a backoff after a period of time equal to PIFS after the end of the frame (step 540).

If the HC algorithm does not select a backoff, then control passes to step 550 and the HC performs a recovery by transmitting during the first time slot following a period of time equal to PIFS after the end of the frame (step 550). The HC then continues to operate.

(2) If a PHY-CCA.indication(busy) is detected within a period of time equal to PIFS after the HC has sent a frame that requires a response (e.g., QoS(+)CF-Poll frame), the HC assumes that a transmission opportunity (TXOP) was granted successfully. The HC then checks whether it has received a PHY-RXSTART.indication before the occurrence of a PHY-CCA.indication(idle). If the PHY-RXSTART.indication is not received before the occurrence of a PHY-CCA.indication(idle) and the HC has not received any frame from the TXOP holder during the granted TXOP, then there could be collision of the frame (e.g., QoS(+)CF-Poll frame) with another frame (e.g., from a neighboring HC). The HC may therefore perform a backoff after the expiration of the granted TXOP.

Figure 6:
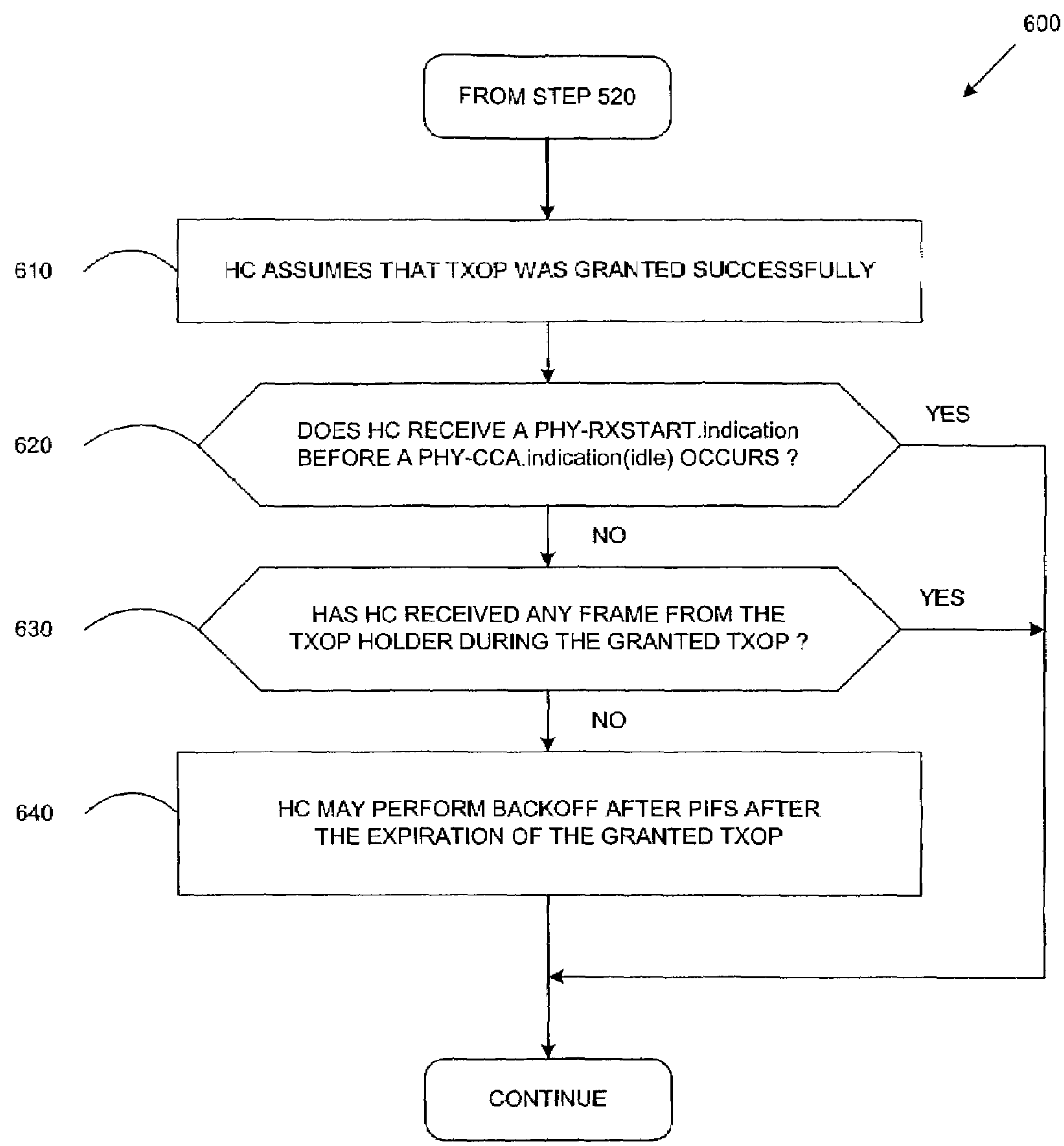
FIG. 6 is a flow chart illustrating a second portion of an advantageous embodiment of a method of the present invention for providing hybrid coordinator recovery and backoff.

The operation of the HC recovery and backoff rules described above is summarized in FIG. 6. FIG. 6 is a flow chart illustrating a second portion of an advantageous embodiment of a method of the present invention for providing hybrid coordinator recovery and backoff. The steps shown in FIG. 6 are collectively referred to with the reference numeral 600.

First, control passes to step 610 from decision step 520 of FIG. 5. This indicates that the HC has determined that a PHY-CCA.indication(busy) has been detected during a period of time equal to PIFS from the end of the transmission of the frame (decision step 520). The HC then assumes that the transmission opportunity (TXOP) was granted successfully (step 610). The HC then determines whether it receives a PHY-RXSTART.indication before the occurrence of a PHY-CCA.indication(idle) (decision step 620). If the HC does receive a PHY-RXSTART.indication before the occurrence of a PHY-CCA.indication(idle), then the HC continues to operate and assumes that the transmission opportunity (TXOP) was granted successfully. If the HC does not receive a PHY-RXSTART.indication before the occurrence of a PHY-CCA.indication(idle), then the HC determines whether it receives any frame from the TXOP holder during the granted TXOP (decision step 630).

If the HC determines that it received a frame from the TXOP holder during the granted TXOP, then the HC continues to operate. If the HC determines that it did not receive a frame from the TXOP holder during the granted TXOP, then the HC may perform a backoff after a period of time equal to PIFS after the expiration of the granted TXOP (step 640). The HC then continues to operate.

Figure 7:
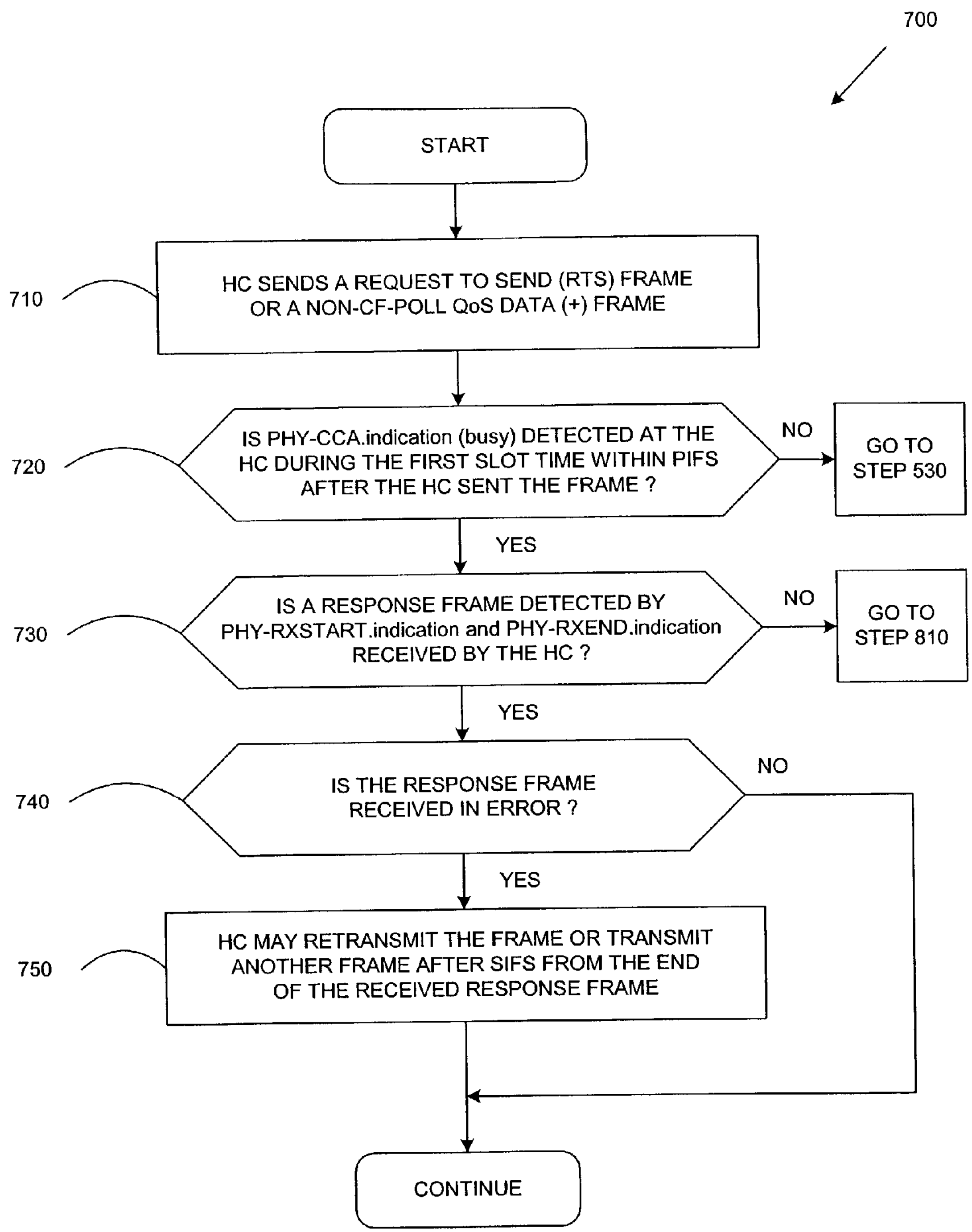
FIG. 7 is a flow chart illustrating a third portion of an advantageous embodiment of a method of the present invention for providing hybrid coordinator recovery and backoff.
Figure 8:
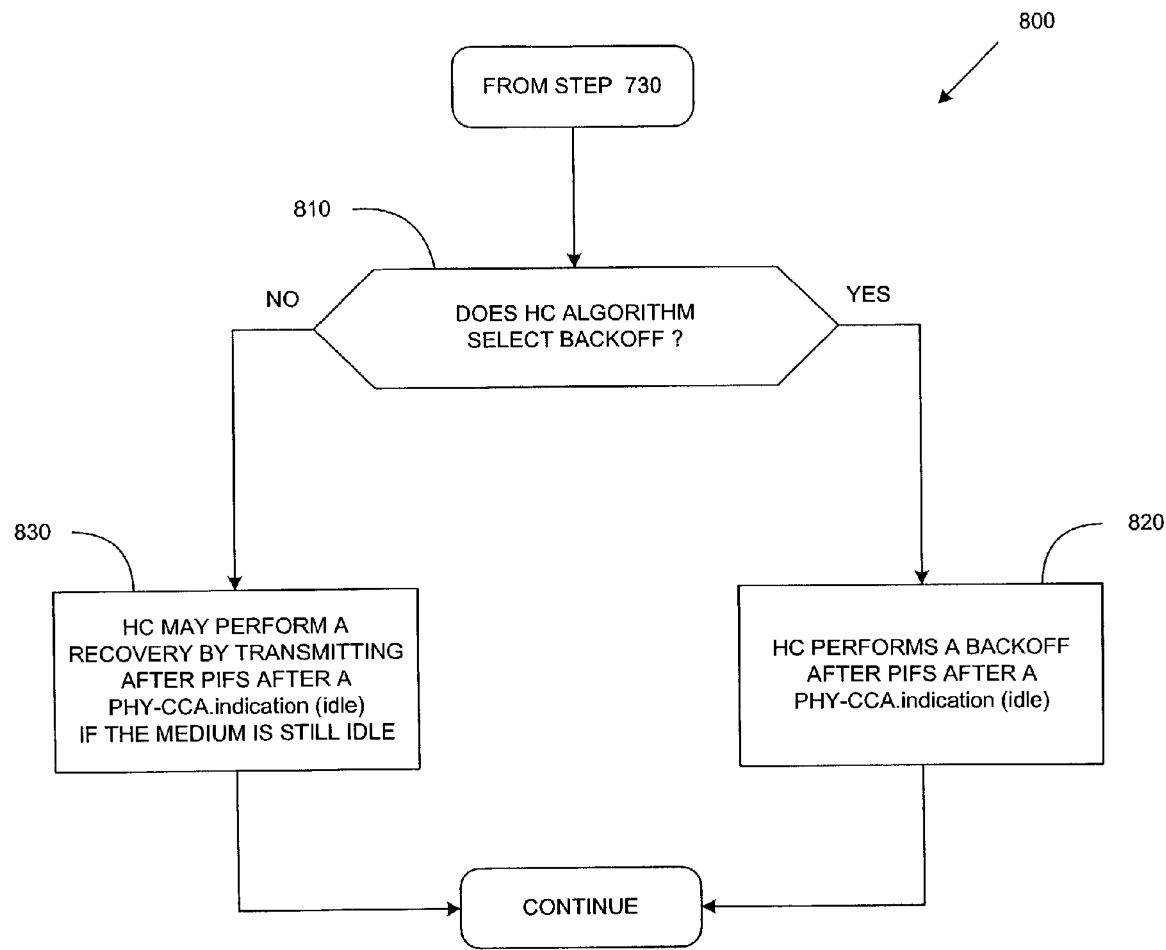
FIG. 8 is a flow chart illustrating a fourth portion of an advantageous embodiment of a method of the present invention for providing hybrid coordinator recovery and backoff.

(3) If a PHY-CCA.indication(busy) is detected within a period of time equal to PIFS after the HC has sent a Request to Send (RTS) frame or a non-CF-Poll QoS Data(+)frame, and if (a) a response frame is detected at the HC by PHY-RXSTART.indication and PHY-RXEND.indication, and (b) the response frame is in error, then the HC may retransmit the frame (or transmit another frame) within a period of time equal to SIFS from the end of the received frame. If there was no PHY-RXSTART.indication detected before a PHY-CCA.indication (idle) was received, then the HC may perform a backoff. above is summarized in FIG. 7 and in FIG. 8. FIG. 7 is a flow chart illustrating a third portion of an advantageous embodiment of a method of the present invention for providing hybrid coordinator recovery and backoff. The steps shown in FIG. 7 are collectively referred to with the reference numeral 700. FIG. 8 is a flow chart illustrating a fourth portion of an advantageous embodiment of a method of the present invention for providing hybrid coordinator recovery and backoff. The steps shown in FIG. 8 are collectively referred to with the reference numeral 800.

First, HC sends a Request to Send (RTS) frame or a non-CF-Poll QoS Data(+)frame (step 710). Then the HC determines whether a PHY-CCA.indication(busy) is detected during a period of time equal to PIFS from the end of the transmission of the frame (decision step 720). If no PHY-CCA.indication(busy) is detected, the control passes to step 530 of FIG. 5 and the HC continues its operation beginning with step 530. If a PHY-CCA.indication(busy) is detected, the HC determines whether a response frame is received by the HC detected by PHY-RXSTART.indication and PHY-RXEND.indication (decision step 730). If a response frame is not detected, the control passes to step 810 of FIG. 8 to perform operations that will be described later.

If a response frame is detected, the HC determines whether the response frame was received in error (decision step 740). If the response frame was not received in error, the HC continues its operation. If the response frame was received in error, the HC may retransmit the frame (or transmit another frame) within a period of time equal to SIFS from the end of the received response frame (step 750). The HC then continues its operation.

In FIG. 8 control passes to step 810 from decision step 730 of FIG. 7. This indicates that the HC has determined that a response frame has not been detected (decision step 730). In one advantageous embodiment of the present invention, the HC is capable of determining the existence of an Overlapping Basic Service Set (OBSS).

The HC algorithm operates to determine whether to perform a recovery or to backoff (decision step 810). If the HC is aware of the existence of an OBSS, then the HC performs a backoff after a period of time equal to PIFS after a PHY-CCA.indication(idle). If the HC algorithm selects a backoff, then control passes to step 820 and the HC performs a backoff after a period of time equal to PIFS after a PHY-CCA.indication(idle) (step 820).

If the HC algorithm does not select a backoff, then control passes to step 830 and the HC may perform a recovery by transmitting during the first time slot following a period of time equal to PIFS after a PHY-CCA.indication(idle) if the medium is still idle (step 830). The HC then continues to operate.

The recovery and backoff rules of the present invention assign the following values for the HC to use in performing a random backoff procedure. The random backoff procedure reduces collisions with other HCs.

(1) The value of $dot11AIFS_{HC}$ is set to a value of one (1). Specifically, $AIFS_{HC}$ equals PIFS (a fixed MIB value).

(2) The value of $dot11CW_{min}$ and the value of $dot11CW_{max}$ are set equal to the value of $dot11CW_{HC}$ (a fixed MIB value).

(3) In one advantageous embodiment of the present invention, the value of $dot11CW_{HC}$ is set to a value of three (3).

In another advantageous embodiment of the present invention, the HC may set the value of AIFS[i] for every value of "i" to a value equal to a sum of the value of PIFS and the value $dot11CW_{max}$. Increasing the value of AIFS[i] avoids collisions with the EDCF access.

One advantage provided by the recovery and backoff rules of the present invention is that the HC may perform a recovery or a backoff depending upon the occurrence of a PHY-RXSTART.indication as well as the occurrence of a PHY-CCA.indication. An additional advantage is that the random backoff with a fixed contention window size for the HC avoids collisions with other HCs. Another advantage is that the HC can also avoid collision with the EDCF access by increasing the value of the AIFS [i]. An additional advantage is that the HC can avoid collisions with other HCs in an Overlapping Basic Service Set (OBSS).

The recovery and backoff rules of the present invention may be implemented by amending the proposed IEEE 802.11e specification to read as follows:

9.10 HCF

The hybrid coordination function (HCF) manages allocation of WM data transfer bandwidth, using a hybrid coordinator (HC) that has higher medium access priority than WSTAs in order to allocate transmission opportunities (TXOPs) to WSTAs. The HC is a type of point coordinator, but differs from the point coordinator used in PCF in several significant ways. Most important is that HCF frame exchange sequences may be used among QSTAs associated in a QBSS during both the CP and the CFP. Another significant difference is that QoS CF-Polls grant a TXOP with duration specified in the QoS(+)CF-Poll frame. QSTAs may transmit multiple frame exchange sequences within given TXOPs, subject to the limit on TXOP duration. All STAs and QSTAs inherently obey the medium access rules of the HCF, because these rules are based on the DCF, and because each QoS(+)CF-Poll, as well as each frame transmitted within the TXOPs, contains a duration value to cause STAs and QSTAs in the BSA to set their NAV to protect that TXOP. All QSTAs shall be able to respond to QoS(+)CF-Polls received from an HC. The HC shall perform delivery of queued broadcast and multicast frames following DTIM beacons in a CFP. The HC may use a longer CFP for QoS delivery and/or QoS polling by continuing with HCF frame exchange sequences after broadcast/multicast delivery for a duration not exceeding dot11CFPMaxDuration. The HC may also operate as a PC, providing (non-QoS) CF-Polls to associated CF-Pollable STAs using the frame formats, frame exchange sequences, and other applicable rules for PCF specified in 9.3. Implementers are cautioned that attempting to intersperse HCF frame exchange sequences and PCF frame exchange sequences in a single CFP can be extremely complex, and that the achievable service quality may be adversely impacted in a QBSS which attempts to provide contention-free support for CF-Pollable (non-QoS) STAs (for further discussion, see the informative note in 7.3.1.4).

9.10.1 HCF Access Procedure

The HCF transfer protocol is based on a polling scheme controlled by an HC operating at the QAP of the QBSS. The HC gains control of the WM as needed to send QoS traffic to QSTAs and to issue QoS(+)CF-Polls to QSTAs by waiting a shorter time between transmissions than the stations using the EDCF or DCF access procedures. The duration values used in QoS frame exchange sequences reserve the medium for a DIFS period longer than the end of the sequence (see FIG. 62.1) to permit continuation of a NAV-protected CF transfer by concatenation of a plurality of CFBs. This extra WM reservation allows the HC to initiate a subsequent TXOP with reduced risk of collision because STAs and all QSTAs other than the TXOP holder and the HC will not be able to begin contending until a DIFS interval later than end of the last transfer within the TXOP.

Because the HP is a type of point coordinator, the HC shall include a CF Parameter Set element in the Beacon frames it generates. This causes a QBSS to appear to be a point-coordinated BSS to STAs. This causes all STAs as well as all QSTAs (other than the HC) to set their NAVs to the dot11CFPMaxDuration value at TBTT as specified in 9.3.3.2. This prevents most contention with the CFP by preventing non-polled transmissions by STAs and QSTAs whether or not they are CF-Pollable.

9.10.1.1 Fundamental Access

When the HC needs access to the WM in order to transmit an MPDU or MMPDU or to start a CFB or CFP the HC shall sense the WM. When the WM is determined to be idle for one PIFS period or longer, the HC shall transmit the first frame of any permitted frame exchange sequence, with the duration value set as provided in 9.10.2.1.

During a CFB or CBP, after each data, QoS data or management type frame with a group address in the Address 1 field, the HC shall wait for one PIFS period, and shall only continue to transmit if CCA is idle. After the last frame of all other frame exchange sequences (e.g., sequences which convey unicast QoS data or management type frames) during a TXOP, except the sole or final frame exchange sequence in a TXOP, the HC or holder of the current TXOP shall wait for one SIFS period and then commence transmitting the first frame of the next frame exchange sequence.

A HC may perform a backoff following an interruption of a frame exchange sequence under the rules found in 9.10.1.2. This backoff shall occur under the rules of the EDCF channel access, using dot11CWminHC=dot11CWmaxHC=$CW_{HC}$, and dot11AIFSHC=PIFS.

9.10.1.2 Recovery and Backoff from the Absence of an Expected Reception

QSTAs, including the HC, are required to respond within any frame exchange sequence after a SIFS period. If there is an interruption in the frame exchange sequence due to no response after a SIFS period or an erroneous response reception, the initiator of the frame exchange sequence may recover from the interruption using the rules found in this subclause.

QSTAs receiving a QoS(+)CF-Poll are required to respond within a SIFS period. If the polled QSTA has no queued traffic to send, or if the MPDUs available to send are all to long to transmit within the specified TXOP limit, the QSTA shall send a QoS Null frame. In the case of no queued traffic, this QoS Null has a QoS control field that reports a queue size of 0 for any TID. In the case of insufficient TXOP size, this QoS Null has a QoS control field that reports the requested TXOP duration needed to send the selected MPDU and TID for the highest priority MPDU that is ready for transmission.

After the HC sends a frame including QoS(+)CF-Poll, if the PHY-CCA.indication(busy) does not occur at the HC during the first time slot following SIFS from the end of the frame transmission, the HC may initiate recovery by transmitting during the first time slot following SIFS from the end of the frame or may perform a backoff after PIFS from the end of the frame. It is the HC's discretion whether to recover or backoff.

After the HC sends a QoS(+)CF-Poll frame, if the PHY-CCA.indication(busy) does occur at the HC during the first slot time following SIFS from the end of the QoS(+)CF-Poll frame transmission, the HC checks if there is a single instance of PHY-RXSTART.indicate before PHY-CCA.indication (idle). If a single PHY-RXSTART.indicate happens, the HC assumes that the TXOP was granted successfully. If a single PHY-RXSTART.indicate does not happen, the HC may initiate recovery by transmitting after PIFS from the time of the PHY-CCA.indication (idle) or may perform a backoff after PIFS from the time of the PHY-CCA.indication (idle). It is the HC's discretion whether to recover or backoff.

After the HC sends an RTS frame or a directed QoS Data(+) frame, with No Ack bit set to zero, excluding CF-Poll subtype, if the PHY-CCA.indication (busy) does occur at the HC within PIFS after the HC sending the frame, the HC checks if it receives a response frame detected by PHY-RXSTART.indicate and PHY-RXEND.indicate (no error). If the response frame is received in error detected by an FCS check error, the HC may retransmit the frame or transmit another frame after SIFS from the end of the received frame. If it does not receive any frame detected by a PHY-CCA.indication(idle) without having a PHY-RXSTART.indicate, the HC may initiate recovery by transmitting after PIFS from the time of the PHY-CCA.indication (idle) or may perform a backoff after PIFS from the time of the PHY-CCA.indication(idle). It is the HC's discretion whether to recover or backoff.

Note: The HC may back off if the HC is aware of the existence of a neighboring BSS in the same channel. Optionally, the HC may set AIFS[i] for every i to longer than (PIFS+CWHC) to avoid collisions with EDCF channel access after performing backoff.

During a polled TXOP, if the beginning of reception of an expected response, as detected by the occurrence of PHY-CCA.indication (busy) at the TXOP holder, does not occur during the first slot time following SIFS from the end of a directed frame transmission requiring an immediate response, the TXOP holder may initiate recovery by transmitting after PIFS from the end of the last transmission. This recovery after PIFS is only permitted by the TXOP holder.

Note: This restriction is intended to avoid collisions due to inconsistent CCA reports in different QSTAs, not to optimize the bandwidth usage efficiency.

If an erroneous frame, as detected by an FCS error after occurrence of PHY-RXSTART.indicate followed by PHY-RXEND.indicate (no error) is received at an QSTA which expects a response to its transmission, the QSTA may initiate recovery by transmitting a frame after SIFS from the end of the last reception.

This concludes the proposed amendment to the IEEE 802.11e specification.

The steps of the method of the present invention for providing recovery and backoff may be carried out by computer-executable instructions stored on a computer-readable storage medium such as a DVD or a CD-ROM. Such a computer-readable storage medium is represented schematically in FIG. 1 as CD-ROM disk 180.

Although the present invention has been described in detail, those skilled in the art should understand that they can make various changes, substitutions and alterations herein without departing from the spirit and scope of the invention in its broadest form.

What is claimed is:

1. A method for providing recovery and backoff for an IEEE 802.11e Medium Access Control (MAC) layer of a Quality of Service (QoS) hybrid coordinator in a Quality of Service (QoS) wireless local area network comprising the steps of:

transmitting from a hybrid coordinator a first frame that comprises one of: a request to send (RTS) frame and a non-CF-Poll Qos Data+ frame;

determining whether said hybrid coordinator received a PHY-CCA busy indication during a point coordination function interframe space (PIFS) from an end of said transmitted first frame; and in response to determining that said PHY-CCA busy indication was received during said point coordination function interframe space (PIFS) from said end of said transmitted first frame, determining whether said hybrid coordinator received a response frame, wherein said method further comprising the steps of:

in response to determining that said hybrid coordinator did not receive said response frame, performing in said hybrid coordinator one of: a recovery and a backoff;

performing said backoff in said hybrid coordinator following a period of time equal to a point coordination function interframe space (PIFS) after an end of said PHY-CCA busy indication; and setting a value of an arbitration interframe space (AIFS) for wireless stations to a value that equals the sum of the value of a point coordination function interframe space (PIFS) and a maximum value of a contention window (CWmax) of a hybrid coordinator.

2. A wireless local are network comprising a plurality of Quality of Service (QoS) wireless stations, wherein at least one of said plurality of Quality of Service (QoS) stations comprises a hybrid coordinator in an IEEE 802.11e Medium Access Control (MAC) layer, wherein said hybrid coordinator is capable of:

transmitting from said hybrid coordinator a first frame that requires a response by a receiver of said first frame;

determining whether said hybrid coordinator has received a PHY-CCA busy indication during a point coordination function interframe space (PIFS) from an end of said transmitted first frame; and in response to determining that said PHY-CCA busy indication has not been received during said point coordination function interframe space (PIFS) from said end of said transmitted first frame, performing in said hybrid coordinator one of: a recovery and a backoff, wherein said hybrid coordinator is further capable of:

transmitting from a said hybrid coordinator a first frame that comprises one of: a request to send (RTS) frame and a non-CF-Poll QoS Data+ frame;

determining whether said hybrid coordinator received a PHY-CCA busy indication during a point coordination function interframe space (PIFS) from an end of said transmitted first frame;

in response to determining that said PHY-CCA busy indication was received during first said time slot following said point coordination function interframe space (PIFS) from said end of said transmitted first frame, determining whether said hybrid coordinator received a response frame;

in response to determining that said hybrid coordinator received said response frame, determining whether said response frame was received in error;

in response to determining that said response frame was received in error, retransmitting said first frame from said hybrid coordinator after a short interframe space after an end of said response frame that was received in error;

in response to determining that said response frame was received in error, transmitting a second frame from said hybrid coordinator after a short interframe space after an end of said response frame that was received in error;

in response to determining that said response frame was received in error, performing a backoff after a point coordination function interframe space (PIFS) after an end of said response frame that was received in error;

in response to determining that said hybrid coordinator did not receive said response frame, performing in said hybrid coordinator one of: a recovery and a backoff;

performing said recovery in said hybrid coordinator by transmitting a frame during a first time slot following a period of time equal to a point coordination function interframe space (PIFS) after said PHY-CCA busy indication; and performing said backoff in a hybrid coordinator following a period of time equal to a point coordination function interframe space after an end of said PHY-CCA busy indication; and setting a value of an arbitration interframe space (AIFS) for a wireless to a value that equals the sum of a value of a point coordination function interframe space (PIFS) and a maximum value of a contention window (CWmax) of a hybrid coordinator.

3. Computer-executable instructions stored on a computer-readable storage medium for providing recovery and backoff for an IEEE 802.11e Medium Access Control (MAC) layer of a Quality of Service (QoS) hybrid coordinator in a Quality of Service (QoS) wireless local area network, said computer-executable instructions comprising the steps of:

transmitting from a hybrid coordinator a first frame that comprises one of: a request to send (RTS) frame and a non-CF-Poll QoS Data+ frame:

determining whether said hybrid coordinator received a PHY-CCA busy indication during a point coordination function interframe space (PIFS) from an end of said transmitted first frame; and in response to determining that said PHY-CCA busy indication was received during said point coordination function interframe space (PIFS) from said end of said transmitted first frame, determining whether said hybrid coordinator received a response frame, wherein said computer-executable instructions further comprise the step of:

in response to determining that said hybrid coordinator did not receive said response frame, performing in said hybrid coordinator one of: a recovery and a backoff, performing said backoff in said hybrid coordinator following a period of time equal to a point coordination function interframe space (PIFS) after an end of said PHY-CCA busy indication;

setting a value of an arbitration interframe space (AIFS) for wireless stations to a value that equals the sum of the value of a point coordination function interframe space (PIFS) and a maximum value of a contention window (CWmax) of a hybrid coordinator.

* * * * *